Nov. 26, 1968 TAMOTSU OKADA 3,412,864
SEWAGE TREATMENT PLANT
Filed July 5, 1966 2 Sheets-Sheet 1
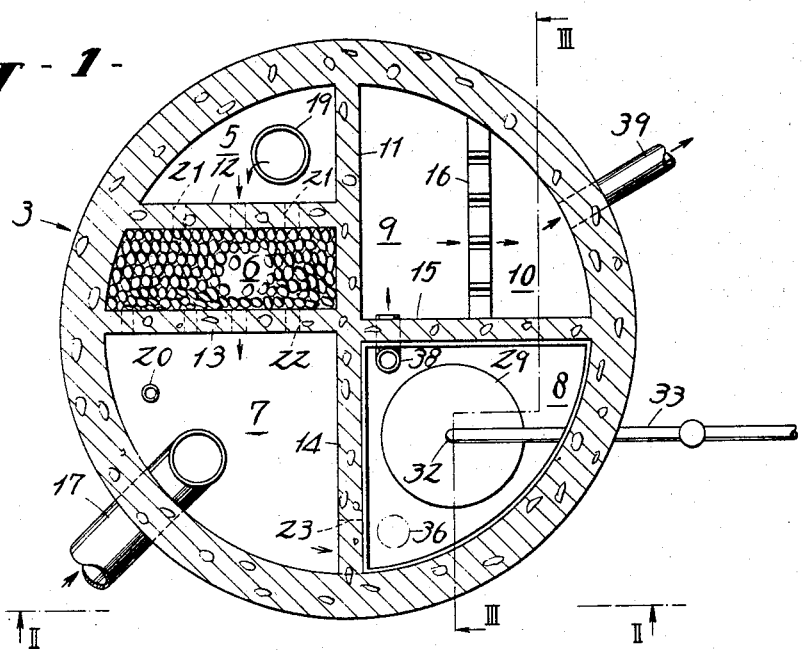
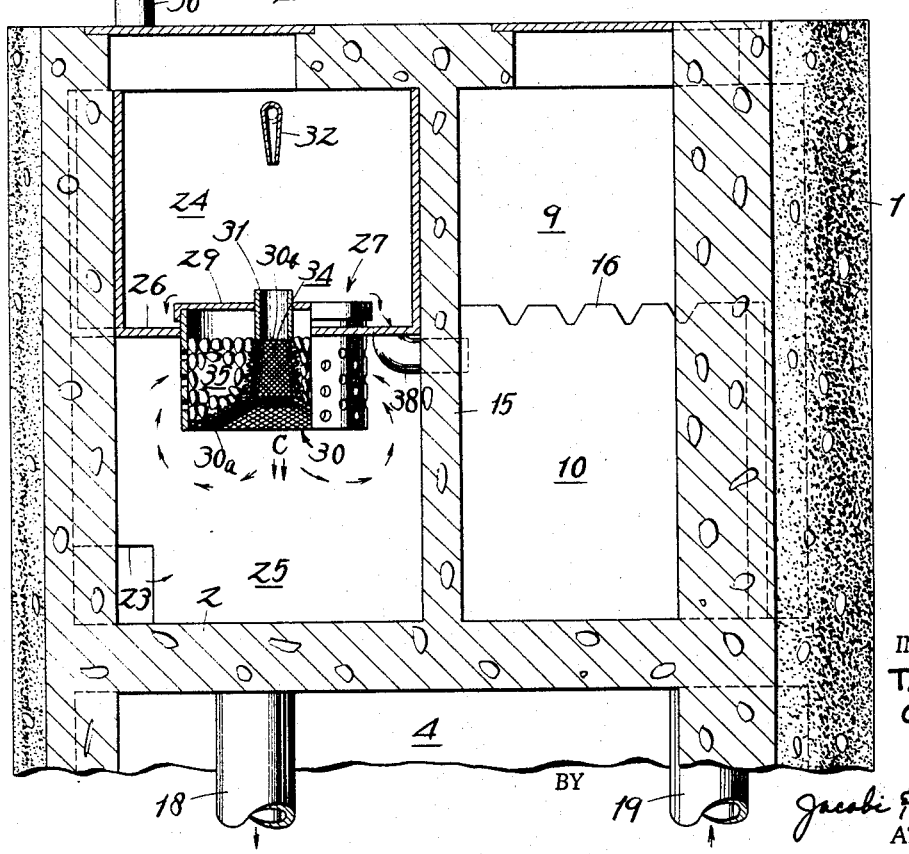
INVENTOR
TAMOTSU OKADA
BY Jacobi & Davidson
ATTORNEYS

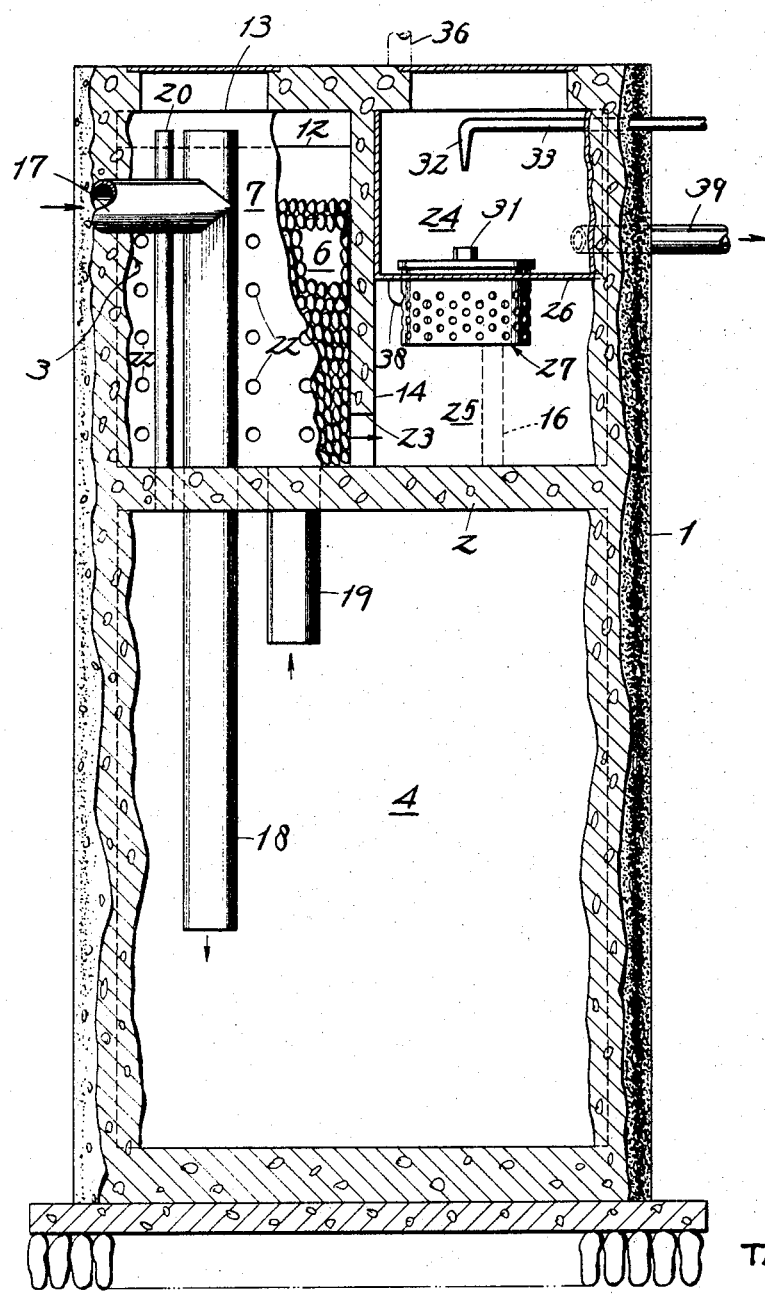

United States Patent Office 3,412,864
Patented Nov. 26, 1968

3,412,864
SEWAGE TREATMENT PLANT
Tamotsu Okada, 9 Umegae-cho 1, Gifu, Japan
Filed July 5, 1966, Ser. No. 562,730
6 Claims. (Cl. 210—151)

ABSTRACT OF THE DISCLOSURE

A sewage treatment plant is disclosed. The sewage treatment plant includes a novel aeration chamber comprising upper and lower rooms with a partition therebetween, the lower room having an inlet for receiving liquid sewage, the upper room having an outlet for treated sewage. A tubular body is provided in the partition between the upper and lower rooms having a portion thereof extending into the lower room, perforations being formed through the extending portion. A second tubular body is concentrically spaced inside the first tubular body and has a porous wall portion defining a space between the first and second tubular bodies which is filled with gravel. An overflow pipe is provided through a cover plate which hermetically seals the first tubular body, the overflow pipe extending into the second tubular body. Means are provided for injecting clear water through the overflow pipe into the lower room of the aeration chamber. The operation of the novel aeration chamber is such that liquid in the lower room thereof will be diluted, aerated and oxidized completely before being discharged from the upper room.

---

This invention relates to a sewage treatment plant and particularly to an improved apparatus for treating domestic sewage by an aerobic process.

The primary object of the invention is the provision of an improved apparatus for treating sewage at such a place where the underground conduits for separate sewage are not constructed.

A further object of the invention is to provide such an apparatus which may completely oxidize the sewage, and which may control the discharge of treated sewage from the plant. The sewage which is treated by the apparatus of the invention, is clear and purified and safe to exhaust into a street, stream or other inhabited area.

The nature and objects of the invention will be more fully apparent from a consideration of the following detailed description of a preferred embodiment thereof, taken in connection with the accompanying drawings, in which:

FIG. 1 is a top plan view of a sewage treatment plant, with the top wall removed, embodying the invention;

FIG. 2 is a view in elevation on the line 2—2 of FIG. 1, with certain parts broken away; and FIG. 3 is a fragmentary sectional view, to a larger scale, taken on line 3—3 of FIG. 1.

The sewage treatment plant of the invention comprises an upright cylindrical tank 1 which may be formed of any suitable material such as reinforced concrete and which may be partially buried in the earth. The tank 1 may be of any desirable size, and as a typical illustration may be 7 feet in length and 4 feet in diameter.

The interior of tank 1 is divided by means of a transversal partition wall 2 into two chambers, or upper compartment 3 and lower compartment 4. The upper compartment 3 is partitioned into six chambers 5, 6, 7, 8, 9 and 10 by longitudinal partition walls 11, 12, 13, 14, 15 and 16 as shown in FIG. 1.

Raw sewage may be discharged into the lower compartment 4 of tank 1 through a sewage discharge pipe 17 which has a tubular chute 18 which opens well below the wall 2 for discharging the sewage laterally and downwardly so as to promote the settling of heavier solids to the bottom of tank 1.

Household sewage is discharged intermittently, so that the sewage in the tank 1 is allowed to remain quiescent for a short period between discharges, during which time the solids settle to the bottom of lower compartment 4 and the buoyant material rises to the surface. A conduit 19 is provided to introduce the liquid from the lower compartment 4 to the first chamber 5 of upper compartment 3. The conduit 19 opens into the lower compartment 4 slightly below the partition wall 2 causing the liquid to pass under the mouth of conduit 19, so that the floating matter is prevented from entering the conduit 19. The settled solids are decomposed by bacteria in the tank. Gas emanating from the digestion of the sludge in compartment 4 is carried off by way of a pipe 20 extending vertically from an opening formed through the partition wall 2 to the atmosphere.

The flow of liquid from lower compartment 4 to upper compartment 3 is effected by the incoming sewage through the pipe 17. The liquid which enters the first chamber 5 of upper compartment 3, passes into the second chamber 6 through openings 21, 21 formed through the wall 12. The second chamber 6 is filled with gravel. The wall 13 between the gravel chamber 6 and third chamber 7 has also openings 22, 22 through which the liquid travels to the third chamber 7. The passage of liquids into the third chamber 7 is governed by the difference in head between the liquid in the chamber 7 and the liquid in the chambers 5 and 6. The permeability of second chamber 6 can be determined, by knowing the maximum flow rate of sewage into the lower compartment 4, to maintain the velocity of flow of liquid into the chamber 7 at a relatively low rate best suited for the sedimentation process. The gravel in second chamber 6 is preferably of fluor.

The third chamber 7 communicates with fourth chamber 8 through an opening 23 at the lower end portion of wall 14. The fourth chamber 8 is partitioned into two parts, or upper room 24 and lower room 25, by means of a transversal plate 26. The liquid from the third chamber 7 flows into the lower room 25 of fourth chamber 8.

The plate 26 has a bore in which the upper end portion of a cylindrical case 27 is mounted water-tightly. The cylindrical case 27 has a relatively larger diameter and has perforations formed through its side wall 28 in a portion thereof extending slightly below the connection to the plate 26 to the lower end thereof. The upper end of cylindrical case 27 is closed air-tightly with a cover plate 29. Placed concentrically inside the case 27 is a generally cylindrical mesh basket 30, the lower end of which basket has an outwardly flaring frusto-conical bottom wall 30a. The open top end 30b of basket 30 has a pipe 31 which extends vertically through the cover plate 29. Positioned above the upper end of pipe 31 in axial alignment, is a nozzle 32 which has a pipe 33 communicating with a source of pressurized clear water. The nozzle 32 injects clear water into the room 34 surrounded by the wall of mesh basket 30 through the pipe 31. The room 35 which is defined by the case wall 28 and mesh basket 30, is filled with fluor gravel.

The numeral 36 designates a pipe, communicating at its one end with the air space of room 24 and the other end with the outside atmosphere so as to provide a free passageway of fresh air into the room 24.

The arrangements of fourth chamber 8 are critical to the present invention, because the aerobic process for sewage disposal is performed effectively in this chamber 8.

When water is injected under pressure from the atmosphere into liquid, it induces air into the liquid to produce many fine bubbles of air. The fine bubbles of air disperse in the liquid to increase the presence of dissolved oxygen therein. As a result, fresh air is drawn together with the clear water into the liquid in room 25. Thus the liquid in room 25 will be diluted, aerated and oxidized completely.

The injection of pressurized water from nozzle 32 impels the liquid in room 34 to flow downwardly. This downward flow of liquid in room 34 causes liquid flow from room 35 into room 25. A driving force is thus produced which causes the liquid in room 25 to flow around the case 27 into the room 35 through the perforation in the case wall 28. Thus, there takes place the circulation of liquid through the perforated wall 28 and mesh basket 30 carrying the fluor gravel in room 25, as indicated by arrows c in FIG. 3. As long as the pressurized water is injected into the room 34 through the pipe 31, this circulation of liquid will continue. During the circulation, the liquid in room 25 is subjected to dilution, aeration, oxidization and filtration to purify evenly the sewage in room 25. It is apparent that the liquid in room 34 will be effectively purified during the circulation. This purified liquid overflows from pipe 31 and is subjected to a final dilution when it overflows. Thus the liquid will be in a completely purified condition when it overflows from the pipe 31.

It has been found, unexpectedly, that if the gravel bed in room 35 is filled with fluor, the purification of sewage can be promoted very effectively. The inventor still cannot definitely theorize the chemical action of fluor gravel in sewage, but it is believed that certain fluoric materials of fluor gravel are soluble in ammonium of sewage and that such fluoric materials serve to promote the oxidization or purification of the sewage.

The diluted and purified liquid overflows from the pipe 31 and trickles along the surfaces of cover plate 29 and partition plate 26 and it flows into a pipe 38 of which outlet empties into the fifth chamber 9. During the time that the liquid is trickling along the surfaces of plates 29 and 26, it is aerated throughly to complete the aerobic process.

It should be noted that approximately the upper half of the case 27 has no perforation in its side wall 28, as shown particularly in FIG. 3, and that there is left an air space 37 above the gravel bed. The lower end of the overflow pipe 31, or its connection to the upper end 30b of mesh basket 30 is carefully determined to govern the liquid level in case 27.

By the provision of space 37, the incoming liquid through opening 23 will build up the air pressure in space 37. This build up of air pressure causes a slow pumping-out of the liquid in case 27 through the pipe 31, when the flow of liquid from the opening 23 is stopped. Thus, the liquid is held in the room 25 for the time required for complete dilution and aeration, even if a large quantity of sewage is discharged suddenly into the plant through the pipe 17. If the air space 37 is not provided in the case 27, the liquid would be discharged suddenly from the overflow pipe 31 as the head rises.

The fifth chamber 9 is a clarification chamber. The clear effluent from the chamber 9 passes over a weir, or wall 16 to flow into the sixth chamber 10 where chlorine may be added to the effluent to make it completely safe to discharge. Thus the water is clear and purified and safe to exhaust through an outlet 39 into a street, stream or other inhabited area.

It will be seen that by my invention a highly efficient sewage disposal apparatus is provided which is compact and which operates in a trouble-free manner. My apparatus has no moving mechanical parts other than the source of clear pressurized water which is relatively inexpensive to operate and maintain.

While I have described but one form of the invention, it is to be understood that other forms, modifications and adaptations can be made all falling within the scope of the claims which follow.

I claim:

1. In a sewage treatment plant, an aeration chamber comprising upper and lower rooms, a partition between said upper and lower rooms, a liquid inlet in said lower room, a liquid outlet in said upper room, a tubular body open at both ends thereof mounted through said partition between said two rooms and extending into said lower room, said body having perforations therethrough in the portion thereof extending into said lower room, said perforations commencing in said extending portion a given distance below said partition to the lower end of said tubular body, a second tubular body having porous wall means positioned in said first-mentioned tubular body in spaced concentric relation to said first body so as to define a room therebetween for receiving gravel, said second tubular body opening into said lower room, a cover plate for hermetically closing the upper end of said first tubular body, an overflow pipe extending through said cover plate into communication with said second tubular body to exhaust therethrough liquid in said lower room of said aeration chamber, and means in said upper room to inject clear water into the liquid in said lower room through said overflow pipe.

2. An aeration chamber as defined in claim 1, wherein said porous wall means of said second tubular body is flared outwardly at the lower end thereof, and wherein said overflow pipe has a lower end which extends a predetermined distance into said first tubular body and opens into said second tubular body.

3. An aeration chamber as defined in claim 1, wherein said second tubular body having porous wall means comprises a generally cylindrical mesh basket.

4. An aeration chamber as defined in claim 3, wherein said mesh basket has an outwardly flared lower end.

5. In a sewage treatment plant, the combination comprising a tank having upper and lower compartment means, a raw sewage inlet to said lower compartment means, said lower compartment means separating liquid from heavier solids, conduit means to introduce liquid from said lower compartment means to said upper compartment means, said upper compartment means having at least two chamber means, one for controlling the head of liquid and the other for subjecting sewage to the process of aeration and dilution including an aeration chamber, said aeration chamber comprising upper and lower rooms partitioned with a water-tight plate, a cylindrical body mounted through said partition plate extending into said lower room, said body being closed at its upper end with an air-tight cover plate having an overflow pipe vertically pierced through said cover plate, a cylindrical mesh basket positioned in said body in spaced concentric relation to said body so as to define therebetween a room for receiving gravel, said basket having an outwardly flaring frusto-conical bottom wall, gravel provided in said room and filled in such manner that an air space is provided between the surface of said gravel and the inner wall of said cover plate, means to inject clear water into the liquid in said lower room of said aeration chamber through said overflow pipe, conduit means for conducting liquid from said overflow pipe through said upper room of said aeration chamber to a clarification chamber, and conduit means for carrying off liquid from the system as a clear purified effluent.

6. The apparatus as defined in claim 5, wherein said gravel is fluor bed.

(References on following page)

References Cited

UNITED STATES PATENTS

| | | | |
|---|---|---|---|
| 2,749,222 | 6/1956 | Munroe | 210—206 X |
| 2,845,179 | 7/1958 | Riole et al. | 210—256 X |
| 2,891,674 | 6/1959 | Yelinck | 210—457 |
| 3,123,555 | 3/1964 | Moore | 210—151 X |
| 3,126,333 | 3/1964 | Williams | 210—256 X |
| 3,182,803 | 5/1965 | Chisholm | 210—266 |
| 3,283,908 | 11/1966 | Komarmy et al. | 210—266 |

FOREIGN PATENTS 2,589  6/1926  Australia.

REUBEN FRIEDMAN, *Primary Examiner.*

J. ADEE, *Assistant Examiner.*